United States Patent
Cherif et al.

(10) Patent No.: US 9,443,657 B1
(45) Date of Patent: Sep. 13, 2016

(54) PIEZO CONTROLLED VARIABLE CAPACITOR

(71) Applicant: TDK Corporation, Tokyo (JP)

(72) Inventors: Bouchaib Cherif, Yorktown Heights, NY (US); Dev V. Gupta, Concord, MA (US); Abbie Mathew, Westford, MA (US); Mohammed Wasef, Westford, MA (US)

(73) Assignee: TDK Corporation, Tokyo (JP)

( * ) Notice: Subject to any disclaimer, the term of this patent is extended or adjusted under 35 U.S.C. 154(b) by 73 days.

(21) Appl. No.: 14/101,833

(22) Filed: Dec. 10, 2013

(51) Int. Cl.
*H01G 5/16* (2006.01)
*H01G 5/18* (2006.01)

(52) U.S. Cl.
CPC . *H01G 5/16* (2013.01); *H01G 5/18* (2013.01)

(58) Field of Classification Search
CPC ......... H01G 5/16; H01G 7/025; H01G 7/026
USPC .................................. 361/290, 281
See application file for complete search history.

(56) References Cited

U.S. PATENT DOCUMENTS

| | | | |
|---|---|---|---|
| 6,242,989 B1 * | 6/2001 | Barber | H01G 5/16 331/177 V |
| 6,529,750 B1 | 3/2003 | Zhang et al. | |
| 6,792,299 B2 | 9/2004 | Ye | |
| 7,006,342 B2 * | 2/2006 | Williams | H01G 5/16 361/277 |
| 8,189,319 B2 | 5/2012 | Kawakubo et al. | |
| 8,237,519 B2 | 8/2012 | Achour | |
| 2002/0025595 A1 | 2/2002 | Xu et al. | |
| 2002/0074621 A1 | 6/2002 | Cheng et al. | |
| 2002/0075626 A1 | 6/2002 | Liu et al. | |
| 2002/0079743 A1 | 6/2002 | Ma et al. | |
| 2004/0036132 A1 | 2/2004 | de los Santos | |
| 2004/0150939 A1 | 8/2004 | Huff | |
| 2004/0173876 A1 | 9/2004 | Musalem et al. | |
| 2004/0190217 A1 | 9/2004 | Stokes | |
| 2004/0246654 A1 | 12/2004 | Williams et al. | |
| 2005/0224916 A1 | 10/2005 | Musalem et al. | |
| 2006/0291134 A1 | 12/2006 | Plowman et al. | |
| 2006/0291135 A1 | 12/2006 | Musalem et al. | |
| 2007/0222462 A1 * | 9/2007 | Gardner | G01D 5/2417 324/662 |
| 2008/0055815 A1 | 3/2008 | Rottenberg | |
| 2009/0002915 A1 | 1/2009 | Ayazi et al. | |
| 2009/0066299 A1 | 3/2009 | Suzuki | |
| 2009/0190284 A1 | 7/2009 | Konishi et al. | |
| 2009/0296308 A1 | 12/2009 | Kawakubo et al. | |
| 2010/0038753 A1 | 2/2010 | Ni | |
| 2010/0214716 A1 * | 8/2010 | Liu | B81B 3/0072 361/290 |
| 2011/0063042 A1 | 3/2011 | Mendolia et al. | |
| 2012/0068672 A1 | 3/2012 | Suzuki | |
| 2012/0250130 A1 * | 10/2012 | Naono | H01L 41/053 359/213.1 |
| 2013/0063857 A1 | 3/2013 | Kim et al. | |
| 2013/0135785 A1 | 5/2013 | Kim et al. | |

(Continued)

OTHER PUBLICATIONS

Goldsmith et al., "RF MEMs Variable Capacitors for Tunable Filters," Raytheon Systems Corporation, Dallas, TX, received Jul. 27, 1998, revised Dec. 30, 1998, 1999 John Wiley & Sons, Inc., 13 pages.

(Continued)

*Primary Examiner* — Dion R Ferguson
(74) *Attorney, Agent, or Firm* — Nixon Peabody LLP

(57) ABSTRACT

A variable capacitor structure using calibration plates, dual variable distance calibration plates, and/or interleaving extentions to the calibration plates.

7 Claims, 7 Drawing Sheets

(56) References Cited

U.S. PATENT DOCUMENTS

2013/0271805 A1 10/2013 Konishi et al.
2015/0162135 A1 6/2015 Cherif
2015/0162886 A1 6/2015 Cherif

OTHER PUBLICATIONS

Mohra et al., "Tunable bandpass filter based on capacitor-loaded metamaterial lines," Electronic Letteres Apr. 23, 2009, vol. 45, No. 9, 2 pages.

Saha et al., "Tunable Bandpass Filter using RF MEMs Capacitance and Transmission Line," Progress in Electromagnetics Research C, vol. 23, 233-247, 2011.

Office Action in U.S. Appl. No. 14/245,033, mailed Nov. 5, 2015.

Office Action in U.S. Appl. No. 14/264,756, mailed Jan. 15, 2016.

Notice of Allowance in U.S. Appl. No. 14/245,033, mailed Apr. 19, 2016.

Notice of Allowance in U.S. Appl. No. 14/264,756, mailed Jun. 7, 2016.

* cited by examiner

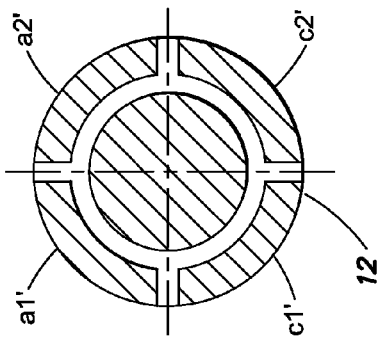
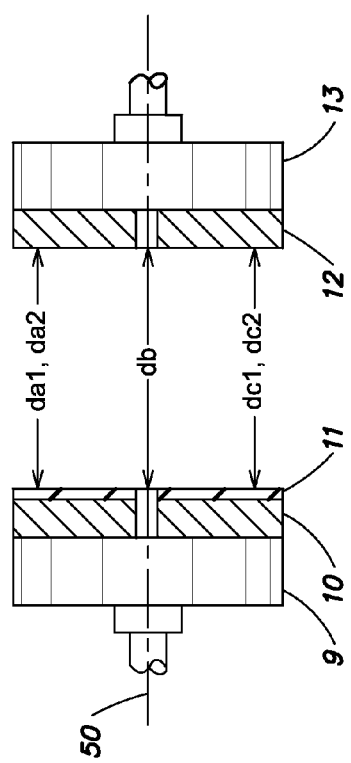
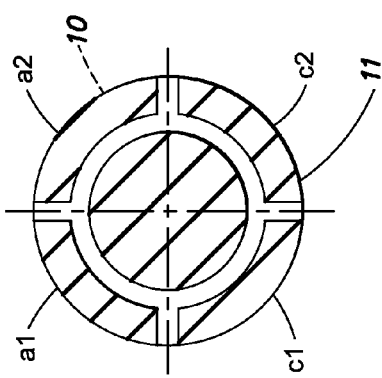
FIG. 2F
FIG. 2E
FIG. 2D $$x3 = \frac{L3 \; x1}{L1}$$

$$x4 = \frac{L4 \; x2}{L2}$$

PIEZO CONTROLLED VARIABLE CAPACITOR

BACKGROUND

1. Technical Field

This patent application relates generally to capacitors, and in particular to a variable capacitor that uses piezoelectric actuator and a calibration structure.

2. Background Information

A capacitor is a two-terminal, passive electrical component used to store energy in an electric field. Capacitors may take many different physical forms, but in general will contain at least two electrical conductors separated by a dielectric (insulator). When a potential difference (voltage) applied across the conductors, a static electric field develops across the dielectric, causing positive charge to collect on one conductor and negative charge on the other conductor. Energy is thereby stored in the resulting electrostatic field. A capacitor is most often characterized by a single constant value, the capacitance, which is the ratio of the electric charge on each conductor to the potential difference between them. Other parameters, such as quality factor (Q), frequency response, and/or linearity, are also important in selecting an appropriate capacitor design.

Capacitors are commonly used in many different types of alternating current (AC) circuits, and especially radio frequency (RF) circuits. Capacitors are combined with inductors and other components to implement filters, duplexers, resonators, tuners, and other functions in these circuits. Electronic devices such as smart phones, tablets, laptop computers, and the like are now typically expected to use many different radio communication protocols and operate over a wide variety of frequencies, while at the same time being as small and inexpensive as possible. The ability to accurately vary the impedance of capacitors becomes a critical aspect of achieving these goals.

Micro-Electro-Mechanical Systems (MEMS) technologies have been used to implement capacitors and other electronic components for RF applications since the late 1970's.

SUMMARY

Problem Description

A need exists for providing improvements to variable capacitors.

Summary of Preferred Solution(s)

By way of example, a variable capacitor structure in one embodiment includes two conductive plates and one or more adjacent calibration plates. An insulator may be provided on one of the conductive plates. The calibration plates provide one or more calibration voltages to a control system. The control system determines an adjustment from the known geometry of the calibration plates to control a piezoelectric actuator and optional lever system. The actuator in turn adjusts the distance between the conductive plates.

The calibration plates may be provided adjacent or on each conductive plate; in one embodiment four calibration plates are provided on each conductive plate to detect variations in distance.

Interleaving the conductive and/or calibration plates provides further fine grained capacitance adjustment.

Further preferred embodiments of the apparatus and system are discussed in detail below.

BRIEF DESCRIPTION OF THE DRAWINGS

The detailed description below refers to the accompanying drawings, of which:

FIGS. 2(d)-2(f) are a solution to mitigate such error using calibration plates a1-a1', a2-a2', c1-c1' and c2-c2'.

DETAILED DESCRIPTION OF AN ILLUSTRATIVE EMBODIMENT

Briefly, the preferred design for a variable capacitor discussed herein

Figure 1A:
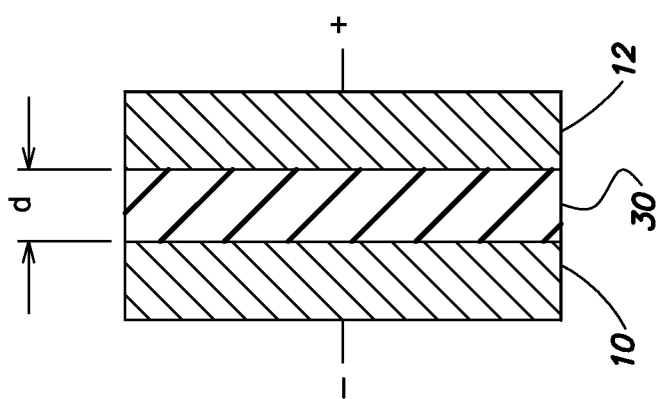
FIGS. 1(a), 1(b) and 1(c) illustrate a basic capacitor structure.
Figure 1B:
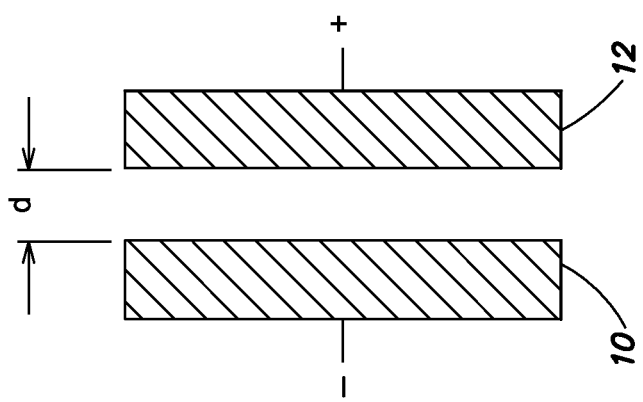
Figure 1C:
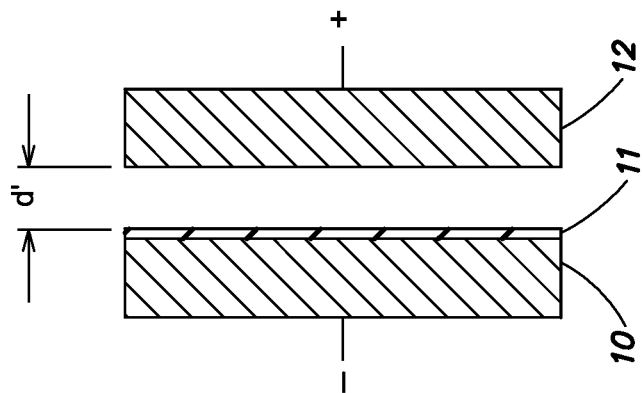

Representative diagrams for various types of simple capacitors are shown in FIG. 1(a), FIG. 1(b) and FIG. 1(c). FIG. 1(a) consists of two conductive plates 10, 12 separated by a distance d. A dielectric material 30 of certain permittivity separates them. The capacitance of this structure is determined by the area of the conductive plates, distance between them and permittivity of the dielectric material 30.

The formula for the capacitance is shown in Equation 1. It assumes that the diameter of the conductive plate is larger than the distance between them. The formula in Equation 1 shows that the capacitance is variable by changing d, the distance between the conductive plates.

$$\text{Capacitance} = \frac{(\text{Area of Conductive Plate}) \cdot (\text{Permittivity of Dielectric Material})}{\text{Distance}(d \text{ or } d')}$$

Equation 1:

Capacitance Formula for Parallel Conductive Plates

FIG. 1(b) is a capacitor structure using air as the dialectic material 30. It is evident that maximum capacitance is achieved by minimizing d. However, as d is made small, there is a possibility of the two conductive materials establishing direct contact, thus shorting the circuit.

As a result, a thin insulator layer 11 may be added on at least one of the conductive plates, as shown in FIG. 1(c), to prevent this shorting from occurring. At small values of d', the distance between the insulating material 11 on one conductive plate 10 and the other plate 12, the capacitance value begin to be dominated by permittivity of the thin insulator 11. The permittivity of the air becomes more predominant in determining the capacitance as d increases.

Figure 2C:
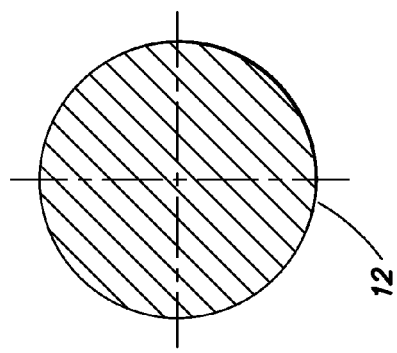
FIGS. 2(a)-2(c) are an illustration of error introduced by varying distances d1, d2 and d3.
Figure 2B:
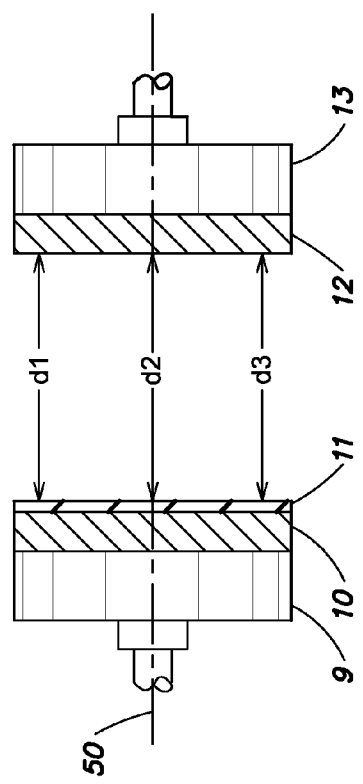
Figure 2A:
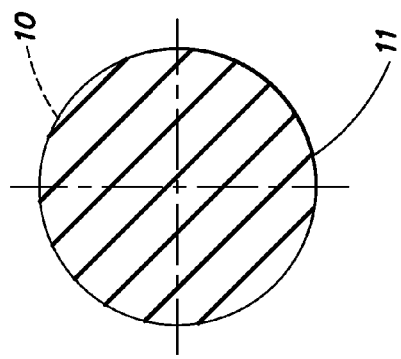

FIG. 1(c) assumes that the distance d' is constant across the surface of the thin insulator 11 and the conductive plate(s) 10, 12. As the area of the conductive plates 10, 12 becomes small, minor variations in distance d' introduce errors in the overall capacitance of the structure. This is illustrated in FIGS. 2(a)-2(c) where d1, d2 and d3 are distances at different locations between the plates. The embodiment in FIGS. 2(a)-2(c) uses circularly shaped conductive plates 10, 12 and correspondingly circularly shaped insulator 11 (a front view of a representative insulator 11 and plate 12 are shown next to the side view of the capacitor structure).

The resulting error in the capacitance value with the configuration of FIG. 2(a) is directly proportional to |d2-d1| and |d2-d3| with d2 being the reference distance as it is on the center axis 50 of the structure. In order to mitigate this error, calibration plates can be added to the structure. This is shown in FIGS. 2(d)-2(f) where a1, a2, c1 and c2 are calibration plates on one side (e.g., the insulator 11 side) and a1', a2', c1' and c2' on the other side (e.g, the conductive plate 12 side). Elements b and b' are the main capacitor plates of each respective side. da1 is the distance between a1 and a1', and da2 is the distance between a2 and a2'. Likewise, dc1 and dc2 are distances between their corresponding calibration plates. The area of each main plate and calibration plate (a1, a2, b, c1, c2, a1', a2', b', c1' and c2') is known from the design parameters, and this in turn enables computation of b/a1, b/a2, b/c1, b/c2, b'/a1', b'/a2', b'/c1' and b'/c2'. These values may then be considered in a calibration process implemented, for example, via a control system discussed in more detail below. For small surface area, the control system may assume that distances across each calibration plate are uniform or any variation is extremely small for further consideration.

FIGS. 2(d)-2(f) are an embodiment consisting of four quadrant calibration plates. However, other variations, such as two quadrants or more than four, can be considered. The quadrants, and more generally, the calibration plates, can have different shapes. For example, the plates in FIGS. 2(a)-2(c) can be rectangular and/or other shapes dictated by the application.

Figure 3:
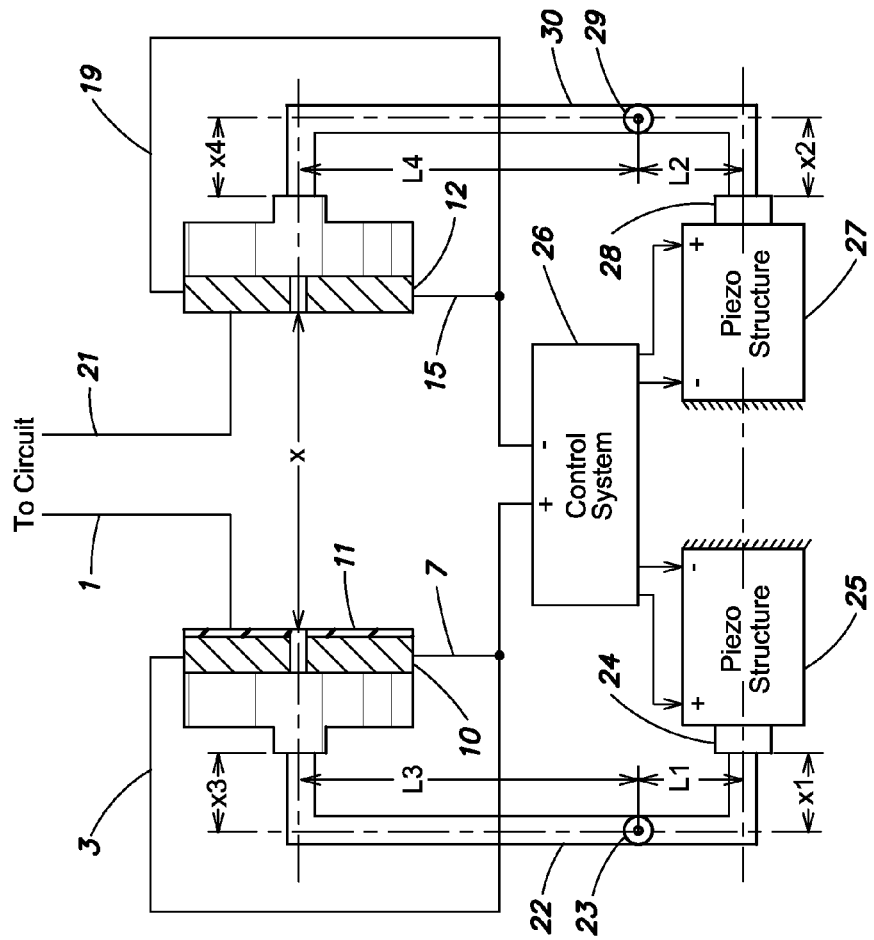
FIG. 3 is a block diagram of one embodiment of a variable capacitor apparatus.
Figure 4:
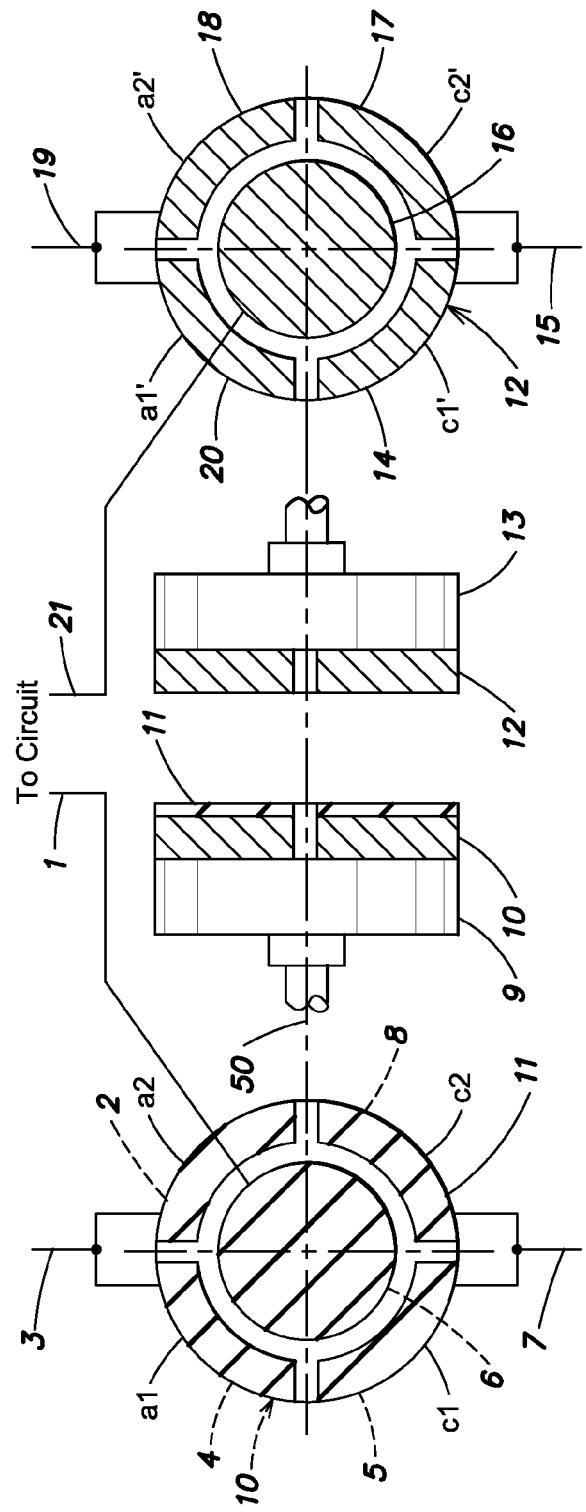
FIG. 4 shows the capacitor structure of FIG. 3 in more detail.

A block diagram of one possible embodiment of a variable capacitor apparatus is shown in FIG. 3 and FIG. 4. The former is a system block diagram while the latter focuses on the details of the capacitor structure. The conductive plates are again indicated by reference numbers 10 and 12. Conductive plate 12 consists of main plate 16 and calibration plates 14, 17 18 and 20. The conductive plate 10 is coated by a thin layer of insulator which is indicated by main plate 6 and calibration plates 2, 4, 5, and 8.

In FIG. 4, the calibration plates 2 and 4 are connected at 3, and calibration plates 5 and 8 are connected at 7. This figure also shows that calibration plates 18 and 20 are connected at 19, and calibration plates 14 and 17 are connected at 15.

FIG. 3 also shows connections 3, 7 15 and 19 from a calibration perspective. The goal of calibration is to apply averaged calibration voltages via a control system, indicated by reference numeral 26, which supplies necessary DC voltages to the piezo structures 25 and 27. The resulting capacitor terminal voltages, indicated by 1 and 21, are provided to the RF circuit in which the capacitor structure is used. These voltages are also applied to an instrumentation system to compute and control the capacitance of main plates 6 and 16.

The available movement of the piezo material in structures 25, 27 is typically extremely small—about 1 µm for 1 mm length. On the other hand, a linear motion of about 1 mm may be required to move the plate 10/insulator 11 with respect to the plate 12. Plates 10 and 12 are thus placed on a suitable bases, indicated by 9 and 13, and a lever system can be employed to amplify motion of the piezo material to a desired 1 mm range along the main axis 50. The lever system is indicated by 22, 23, 29 and 30 where 22 and 30 are levers and 23 and 29 are the fulcrums. The movement of the piezo structure is amplified by distance L3/L1 one side and L4/L2 on the other.

Figure 5D:
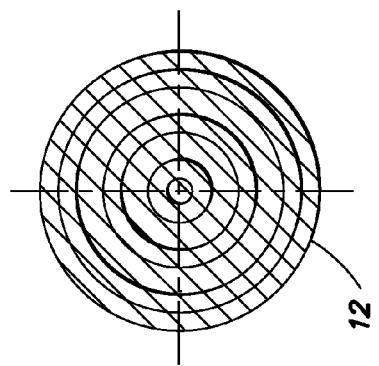
FIGS. 5(a)-5(d) and 5(e)-5(h) illustrate different possible configurations for the calibration structures.
Figure 5C:
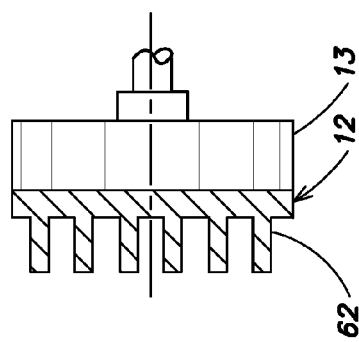
Figure 5B:
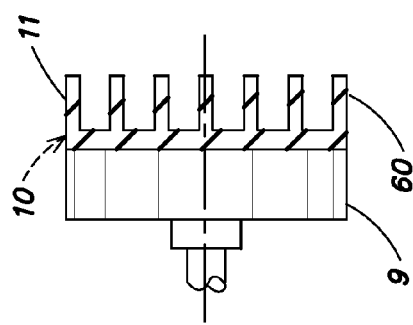
Figure 5A:
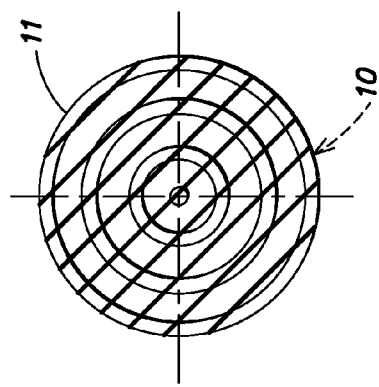
Figure 5H:
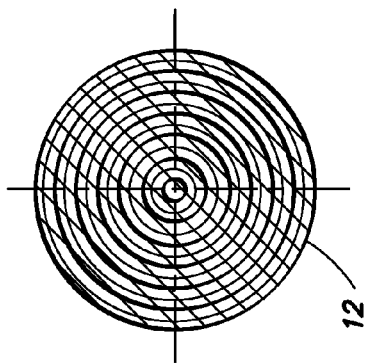
Figure 5G:
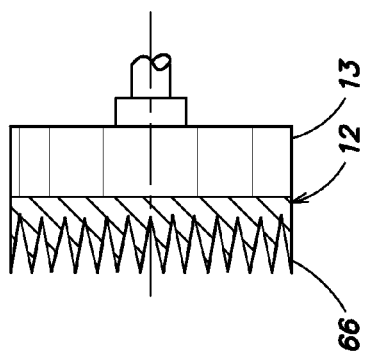
Figure 5F:
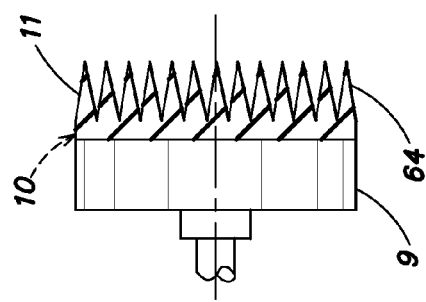
Figure 5E:
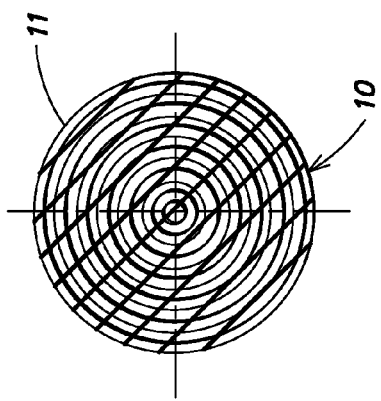

The conductive plates in the embodiment of FIG. 4 are circular, flat surfaces, which are the simplest structures. However, The capacitance of these structures can be increased by increasing their surface area. Examples of achieving this by using innerleaving extentions to one or more sections of the plates are shown in FIGS. 5(a)-5(d) (rectangular interleaving extentions 60, 62) and FIGS. 5(e)-5(f) (with triangular interleaving extentions 64, 66). The maximum capacitance in these illustrations occurs when the two plates 10, 12 are at a minimum distance determined by thickness of the thin insulator material. As the two plates 10, 12 are separated, the capacitance drops. The characteristic of capacitance versus distance between the plates 10, 12 is determined by dimensions of the rectangular or triangular patterns used for the extention sections.

While various embodiments of the invention have now been particularly shown in the drawings and described in the text above, it will be understood by those skilled in the art that various changes in form and details may be made therein without departing from the scope of the invention. It is intended, therefore, that the invention be limited only by the claims that follow.

What is claimed is:

1. A variable capacitor apparatus comprising:
   a first conductive plate having an insulator disposed thereon;
   a second conductive plate;
   one or more calibration plates disposed adjacent at least one of the first conductive plate and/or the second conductive plate;
   a control circuit, coupled to the one or more calibration plates to provide a control voltage;
   a piezoelectric actuator, coupled to receive the control voltage; and
   a lever, coupled between the piezoelectric actuator and one of the first or second conductive plates, to provide, in response to the control voltage, a change in relative position of the first conductive plate with respect to the second conductive plate.

2. The apparatus of claim 1 wherein a plurality of calibration plates are disposed adjacent each of the first and second conductive plates.

3. The apparatus of claim 1 wherein the first and second conductive plates are generally circular in shape and disposed along a common axis, with the piezoelectric actuator and lever further arranged to provide a change in relative position along the common axis.

4. The apparatus of claim 3 wherein either the conductive plates and/or calibration plates further comprise interleaving extension sections having either a rectangular or triangular cross sectional shape.

5. The apparatus of claim 1 wherein the piezoelectric actuator and lever are a respective first piezoelectric actuator and lever coupled to the first conductive plate, and the control circuit provides a second control voltage, the apparatus additionally comprising:
   a second piezoelectric actuator coupled to receive the second control voltage; and
   a second lever, coupled between the second piezoelectric actuator and the second conductive plate, to provide, in response to the second control voltage, a change in relative position of the first conductive plate with respect to the second conductive plate.

6. The apparatus of claim 1 the control circuit provides the control voltage depending on a configuration of the calibration plates.

7. The apparatus of claim 6 wherein a configuration of the calibration plates comprises is to provide a four calibration plates for each of the first and second conductive plates, where a1, a2, c1 and c2 are an area of the calibration plates for the first conductive plate, a1', a2', c1' and c2' are an area of the calibration plates for the second conductive plate, b and b' are an area of for the respective first and second conductive plates, and the control circuit determines the control voltage by determining b/a1, b/a2, b/c1, b/c2, b'/a2', b'/c1' and b'/c2'.

* * * * *